United States Patent
Hoeher et al.

(10) Patent No.: US 11,477,627 B2
(45) Date of Patent: Oct. 18, 2022

(54) BLUETOOTH COMMUNICATION ON BOARD A MOTOR VEHICLE

(71) Applicant: Bayerische Motoren Werke Aktiengesellschaft, Munich (DE)

(72) Inventors: Peter Adam Hoeher, Heikendorf (DE); Alaa Mourad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/279,475

(22) PCT Filed: Nov. 20, 2019

(86) PCT No.: PCT/EP2019/081958
§ 371 (c)(1),
(2) Date: Mar. 24, 2021

(87) PCT Pub. No.: WO2020/126272
PCT Pub. Date: Jun. 25, 2020

(65) Prior Publication Data
US 2022/0038876 A1 Feb. 3, 2022

(30) Foreign Application Priority Data
Dec. 18, 2018 (DE) ..................... 10 2018 132 714.5

(51) Int. Cl.
*H04W 4/80* (2018.01)
*H04W 4/40* (2018.01)
*H04W 84/12* (2009.01)
(52) U.S. Cl.
CPC ............... *H04W 4/80* (2018.02); *H04W 4/40* (2018.02); *H04W 84/12* (2013.01)

(58) Field of Classification Search
CPC .......... H04W 4/80; H04W 4/40; H04W 84/12
USPC ....................................................... 455/41.2
See application file for complete search history.

(56) References Cited

U.S. PATENT DOCUMENTS

| | | | |
|---|---|---|---|
| 9,686,754 B2 * | 6/2017 | Fukuhara | H04W 52/28 |
| 10,091,742 B2 * | 10/2018 | Nakano | H04W 52/245 |
| 2011/0210820 A1 * | 9/2011 | Talty | H04L 63/0492 |
| | | | 340/10.51 |

(Continued)

FOREIGN PATENT DOCUMENTS

| | | |
|---|---|---|
| DE | 10 2011 011 845 A1 | 3/2012 |
| DE | 10 2011 087 333 A1 | 5/2013 |
| DE | 11 2012 006 980 B4 | 7/2017 |

OTHER PUBLICATIONS

International Search Report (PCT/ISA/210) issued in PCT Application No. PCT/EP2019/081958 dated Jan. 31, 2020 with English translation (five (5) pages).

(Continued)

*Primary Examiner* — April G Gonzales
(74) *Attorney, Agent, or Firm* — Crowell & Moring LLP (57) ABSTRACT

Communication is determined via a first wireless signal in the region of a motor vehicle. A second wireless signal is transmitted in the region of the motor vehicle. The first signal is in a first frequency range which is approved for use according to the Bluetooth® standard. The second signal is in a second frequency range which is approved for use according to the WLAN standard and the Bluetooth® standard.

19 Claims, 5 Drawing Sheets

(56) References Cited

U.S. PATENT DOCUMENTS

2015/0208364 A1* 7/2015 Fukuhara ................ H04W 4/48
  455/522
2016/0037557 A1* 2/2016 Gu ........................ H04W 74/02
  370/338

OTHER PUBLICATIONS

German-language Written Opinion (PCT/ISA/237) issued in PCT Application No. PCT/EP2019/081958 dated Jan. 31, 2020 (six (6) pages).
German-language Search Report issued in German Application No. 10 2018 132 714.5 dated Aug. 9, 2019 with partial English translation (13 pages).

* cited by examiner

BLUETOOTH COMMUNICATION ON BOARD A MOTOR VEHICLE

BACKGROUND AND SUMMARY OF THE INVENTION

The present subject matter relates to communication by means of Bluetooth® signals and Bluetooth® communication aboard a motor vehicle.

A wireless communication link according to the IEEE 802.15.1 Bluetooth® standard may be formed on board a motor vehicle, for example, to connect a headset with a personal mobile device. The motor vehicle may be temporarily situated in the area of a station for the wireless transmission of information according to the IEEE 802.11 WLAN standard, for example, in that the motor vehicle drives past a place or building at which a WLAN station ("hotspot") is installed. Frequency ranges of WLAN and Bluetooth® may overlap, such that the communication link in the motor vehicle may be impaired by the WLAN signal. As a result, a voice connection which is transmitted by means of Bluetooth® may be severed.

Various proposals have been made for avoiding or resolving collisions between Bluetooth® and WLAN signals. However, they are not applicable or are not effective if the Bluetooth® device does not stay in the range of the WLAN signal for a longer time. Even if the available spectrum in the range of approximately 2.4 to 2.483 GHz is used entirely by WLAN signals, collision resolution cannot be performed.

One object of the present subject matter is to provide an improved technology for communication by means of Bluetooth® signals on board a motor vehicle. The present subject matter achieves this object by means of the subject matter of the independent claims. Subclaims describe preferred embodiments.

According to a first aspect of the present subject matter, a method comprises steps of determining communication by means of a first wireless signal in the area of a motor vehicle; and transmitting a second wireless signal in the area of the motor vehicle. The first signal is in a first frequency range which is approved for use according to the Bluetooth® standard, and the second signal is in a second frequency range which is approved for use according to the WLAN standard and the Bluetooth® standard.

It has been recognized that that a communication partner according to the WLAN standard usually checks whether a frequency range is occupied by a signal before it transmits signals in this frequency range ("listen before talk"). However, the signal of a Bluetooth® connection is often too weak to be detected by the WLAN communication partner. According to the present subject matter, a second signal may be transmitted which is stronger than a Bluetooth® signal. The second signal may be detected by one or several WLAN communication partners in the area of the motor vehicle, whereupon the communication partner or partners can use the corresponding frequency range in a reduced manner. In particular, transmission power and/or utilized bandwidth may be reduced, so that the frequency range can be used by Bluetooth® signals.

A WLAN channel usually occupies significantly more bandwidth than a Bluetooth® channel; thus, the reduced utilization of the WLAN channel makes it possible to use several Bluetooth® channels on board the motor vehicle simultaneously. A Bluetooth® connection usually requires a plurality of channels, between which switching is performed in rapid succession ("frequency hopping"). By means of the Bluetooth® channels which are kept free according to the present subject matter, it is possible to maintain the Bluetooth® connection even if only a few other Bluetooth® channels are available. The Bluetooth® communication on board the motor vehicle may be more stable. Transmission quality of the Bluetooth® connection may be increased.

It is preferred that the second signal is not included in the communication. This signal, which is independent of the Bluetooth® communication, may be specifically designed in such a way that it can be received and observed by a WLAN station. The Bluetooth® communication may leave a frequency range open which is used by the second signal.

Several Bluetooth® channels may be defined in the second frequency range, wherein the second signal occupies only one of these Bluetooth® channels. A channel according to the Bluetooth® or Bluetooth® LE ("low energy") standard may have a bandwidth of approximately 1 MHz, while a WLAN channel usually has a significantly greater bandwidth. Depending on the technology used (for example, according to IEEE 802.11b, g, or n; optionally also b, d, e, h, i, or j), the bandwidth of a WLAN channel in the 2.4 GHz range is typically approximately 20 to 40 MHz. Thus, the second signal may occupy a relatively small range in an available spectrum and can thereby provide a relatively large range for the Bluetooth® communication.

A method according to one of the preceding claims, wherein the second signal is in the range of one of the WLAN channels 1, 6, or 11. The defined WLAN channels in the 2.4 GHz band usually overlap one another in the 2.4 GHz range which is also used by Bluetooth®. A channel 13 which is allowed in Japan has a center frequency of 2.484 MHz and is outside the Bluetooth® range. If only non-overlapping WLAN channels are used, a maximum of three channels can be occupied in the frequency range, namely, channels 1, 6, or 11. A WLAN station normally chooses one of these channels, such that the second signal can be particularly efficient in this range.

The same may apply to the WLAN channels 1, 5, 9, and 13 for 802.11g and 802.11n in the 2.4 GHz band in Europe and Japan, in order to operate up to four WLAN channels in parallel with as little interference as possible.

The second signal may be in the center of a frequency range of the selected WLAN channel. As a result, the second signal can be received and evaluated by the WLAN station in an improved manner. A bandwidth reduction of the WLAN station in the range of the second signal can have an improved effect on Bluetooth® channels which are in the range of the WLAN channel.

The second signal may comprise a WLAN signal. As a result, the WLAN station can better respond to the second signal. In particular, the second signal may carry a modulation which is usual for WLAN. Optionally, useful data may also be transmitted via the second signal, wherein useful data may be valid data according to the WLAN standard. In other embodiments, the second signal may also comprise no useful data and, for example, transport noise.

The second signal is preferably transmitted as long as the communication takes place on board the motor vehicle. The second signal may be discontinued only if the Bluetooth® communication on board the motor vehicle has ended. It may thus be ensured that the communication can be carried out completely. Alternatively, the second signal may be transmitted only while information is transmitted via the Bluetooth® connection. Thus, by means of Bluetooth®, two devices can be in a connection which requires very low bandwidth, while no second signal is provided. As soon as data are to be transmitted, for example, because a voice connection is to be established between the devices, for example, in order to transmit a telephone call, the second signal may be transmitted in order to free up the bandwidth which is required for the call data via Bluetooth®.

The second signal may be transmitted at predetermined time intervals. For example, the second signal may be transmitted periodically, having a period duration of, for example, several 10 to several 100 ms. In the time periods in which the second signal is inactive, the frequency range may be used for the Bluetooth® connection. Preferably, the second signal is synchronized with Bluetooth® traffic data. In particular, the second signal can be transmitted only if data are pending for transmission via the Bluetooth® connection. When using a hands-free device which is based on Bluetooth®, the signal may be transmitted for 1 ms and then paused for 2.7 ms. For example, packets of the type HV3 can thus be transmitted in an improved manner.

The communication may be determined on the basis of the first signal. For this purpose, it may be determined on board the motor vehicle whether wireless signals can be received on one or several Bluetooth® channels. It is also possible to determine whether the channels are occupied by a Bluetooth® connection, for example, by detecting the frequency occupancy method ("frequency hopping") which is typical of Bluetooth®. Thus, it can be safely determined whether there is a need for Bluetooth® bandwidth, without interfering with one of the Bluetooth® devices.

The communication may be determined based on a connection request from a communication partner of the communication. For this purpose, in particular one of the communication partners of the Bluetooth® connection may communicate that a Bluetooth® connection is to be established, or that a data transmission is imminent, for example, because voice data of a telephone call are to be transmitted. This allows the second signal to be output and Bluetooth® bandwidth to be provided even before the Bluetooth® connection is activated.

The communication may in particular relate to a voice connection. Generally, a voice connection typically requires a high level of connection stability. A latency period for the transmission of information should usually be small. It should be noted that data cannot be retransmitted when using a Bluetooth® profile for a hands-free device ("hands free calling profile"). If a transmitted data packet does not arrive correctly at the recipient, it is not possible to compensate for the loss. However, requirements for bandwidth may be low. The communication may also relate to data transmission. In one embodiment, via the Bluetooth® connection, it is possible to transmit data between a device and the motor vehicle, the data being conveyed by means of another wireless communication device to an external location which is outside the motor vehicle. This may be data of a telephone call or data of a data connection, for example, via the Internet.

According to a second aspect of the present subject matter, an apparatus on board a motor vehicle relates to a device for determining communication in the area of the motor vehicle by means of a first wireless signal which is in a frequency range which is approved for use according to the Bluetooth® standard; a transmitting device for transmitting a second wireless signal which is in a frequency range which is approved for use according to the WLAN standard and the Bluetooth® standard; and a processing device which is configured to control transmission of the second signal after the communication has been determined.

The apparatus may be fixedly installed on board the motor vehicle and may ensure that Bluetooth® communication between devices in the area of the motor vehicle is possible in an improved manner. Bluetooth® communication may be made possible in an improved manner in particular in an interior space of the motor vehicle.

The processing device may be configured to carry out all or part of a method described herein. For this purpose, the processing device may comprise a programmable microcomputer, microcontroller, general-purpose processor, central processing unit (CPU), field-programmable gate array (FPGA), electronic control unit, application-specific integrated circuit (ASIC), and the method may be available in the form of a computer program product having programming code means. The computer program product may also be stored on a non-transitory computer-readable data carrier. Features or advantages of the method may be transferred to the apparatus, or vice-versa.

The Bluetooth® communication may take place between two communication partners. One of the communication partners may comprise a hands-free system on board the motor vehicle. The hands-free system may be implemented in the form of a headset to be attached to a person, or in the form of a system installed in the motor vehicle and having a loudspeaker and a microphone. In a further embodiment, coupling between a mobile device such as a smartphone and the vehicle is also possible, for example, to synchronize data, to use an input and/or output system of the device for the motor vehicle, or for another purpose.

DETAILED DESCRIPTION OF THE DRAWINGS

Figure 1:
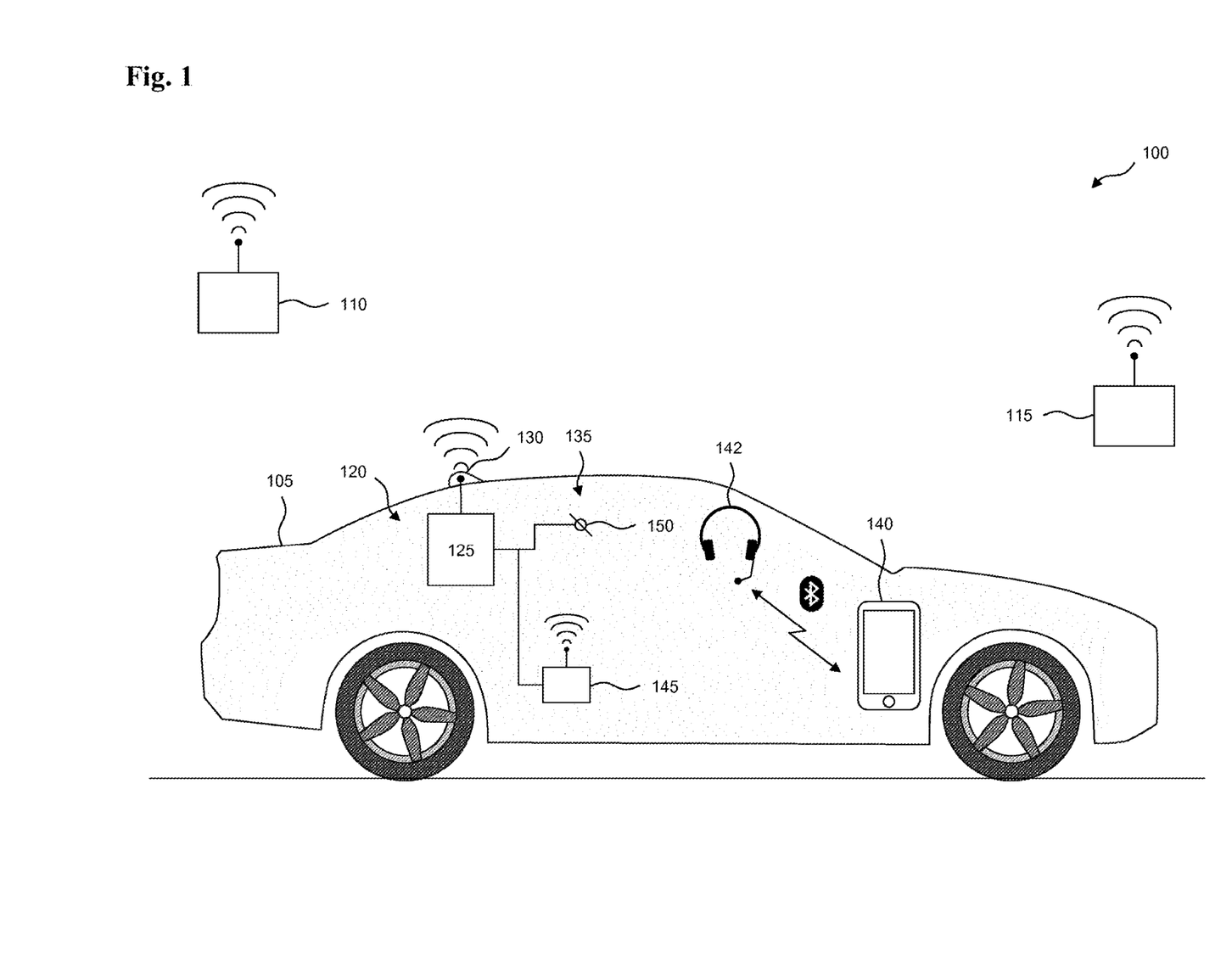
FIG. 1 illustrates a system.

FIG. 1 depicts a system 100 which comprises a motor vehicle 105 and an optional external location 110. A data link may exist between the motor vehicle 105 and the external location 110, which may run in particular over a mobile radio network. The external location 110 is typically stationary and may be implemented via a server or a service, optionally in a cloud. For example, the external location 110 may comprise a telecommunication device such as a telephone, or a server or service, for example, for providing data from the World Wide Web (WWW).

An apparatus 120 is installed on board the motor vehicle 105 and comprises a processing device 125, a transmitting device 130, and an electronic device 135 which is configured for determining communication in the area of the motor vehicle 105. A mobile device 140 may be located in the area of the motor vehicle 105 which may maintain a Bluetooth® connection to another communication partner in the area of the motor vehicle 105. The second communication partner is, for example, depicted as a headset 142. In a preferred embodiment, the headset 142 is configured in the form of a device which is connected to the motor vehicle 105. The headset 142 may comprise several loudspeakers and/or microphones which may be distributed on board the motor vehicle 105.

The transmission device 130 may be integrated with a communication device for communicating with the external location 110, and is configured to transmit an electromagnetic signal in the area of the motor vehicle 105 which is in a frequency range which is approved both for WLAN according to IEEE 802.11 and for Bluetooth® according to IEEE 802.15.1. This frequency range is preferably in the 2.4 GHz band, in particular between approximately 2402 MHz and approximately 2480 MHz.

In a first variant which forms the basis for the depiction of FIG. 1, the electronic device 135 may comprise a receiving device 145 for receiving electromagnetic signals in an area which is approved for use by Bluetooth® or Bluetooth® LE. This frequency range is preferably in the 2.4 GHz band, in particular between approximately 2402 MHz and approximately 2480 MHz. If a wireless Bluetooth® connection exists in the area of the motor vehicle 105, in particular on board the motor vehicle 105, this can be determined by detecting the signals exchanged thereby, by means of the receiving device 145. The Bluetooth® connection may be established with the receiving device 145, or the receiving device 145 is passive with respect to the Bluetooth® connection.

In a second variant, the electronic device 135 may comprise an interface 150 to a communication partner which is a terminal of the Bluetooth® connection. This communication partner may in particular be fixedly installed on board the motor vehicle 105 and, for example, comprise a hands-free device or a protocol converter (gateway) to another system on board the motor vehicle 105. In one embodiment, data may be transmitted from the protocol converter to the external location 110. The communication partner may signal an existing Bluetooth® connection or the intention of establishing a Bluetooth® connection to the interface 150 in the area of the motor vehicle.

It is proposed that the processing device 125 is configured to support a Bluetooth® connection in the area of the motor vehicle, in that a signal is transmitted by means of the transmitting device 130 which causes a WLAN station, of which the transmission signals could interfere with the Bluetooth® connection, to act in a less interfering manner. For this purpose, the signal is in particular to signal an occupancy of a frequency range which is used by the station 115.

Figure 2:
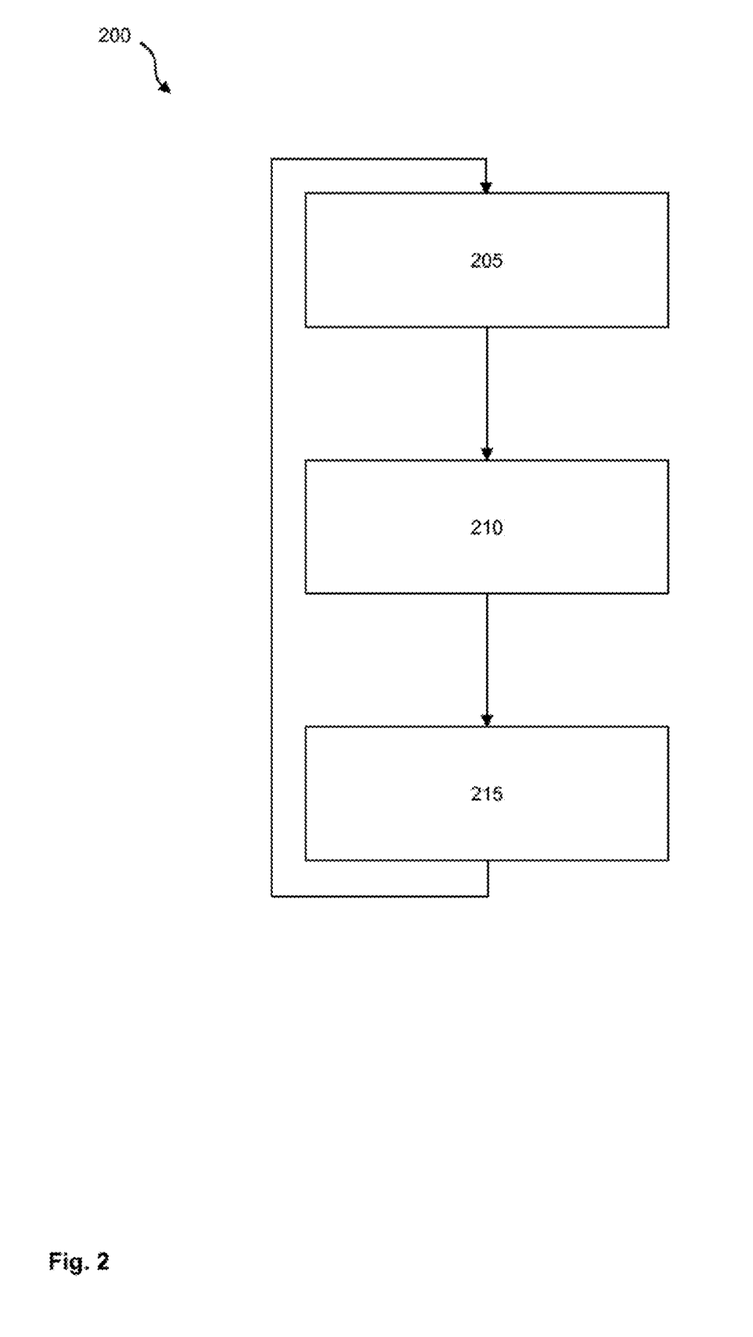
FIG. 2 illustrates a flow chart of a method.

FIG. 2 depicts a flow chart of an example method 200 for ensuring bandwidth for a Bluetooth® connection in the area of a motor vehicle 105. In particular, the method 200 may be carried out by means of an apparatus 120.

In a step 205, it may be determined whether Bluetooth® communication exists or is to be established in the area of the motor vehicle 105. Existing Bluetooth® communication may be determined by means of the receiving device 145; Bluetooth® communication which is imminent or which is being established may be determined by means of the interface 150.

In a step 210, a channel may be determined on which a signal is to be transmitted in the area of the motor vehicle 105, in order to alert the station 115 that communication is taking place in a surrounding frequency range. Preferably, one of the Bluetooth® channels 0 to 8, 11 to 20, or 24 to 32 is selected for this purpose. However, Bluetooth® channels 9, 10, 21 to 23, and 33 to 36 are usually outside of utilized WLAN channels and may not be very effective for the proposed technology. Bluetooth® channels 37 to 39 may be important for establishing a Bluetooth® connection and should not be selected.

Most WLAN stations 115 use one of the WLAN channels 1, 6, and 11 in order to optimize bandwidth utilization. Preferably, the selected Bluetooth® channel is essentially in the center of a WLAN channel which the station 115 uses. If the WLAN channel used by station 115 is not known, a WLAN channel may be guessed, or the second signal may be transmitted on several Bluetooth® channels. For example, Bluetooth® channel 4 may be determined for WLAN channel 1, Bluetooth® channel 16 may be determined for WLAN channel 6, or Bluetooth® channel 29 may be determined for WLAN channel 11. Slight deviations are possible.

In a step 215, a signal in the area of the motor vehicle 105 may be transmitted to the station 110. The signal may follow the WLAN standard in at least some respects and, in particular may comply with a specified maximum transmission power, which may be approximately 1 W in the U.S. and approximately 100 mW in most other areas of the world.

The method 200 may pause at step 215, or may return to step 205 or 210 and cycle through again.

Figure 3:
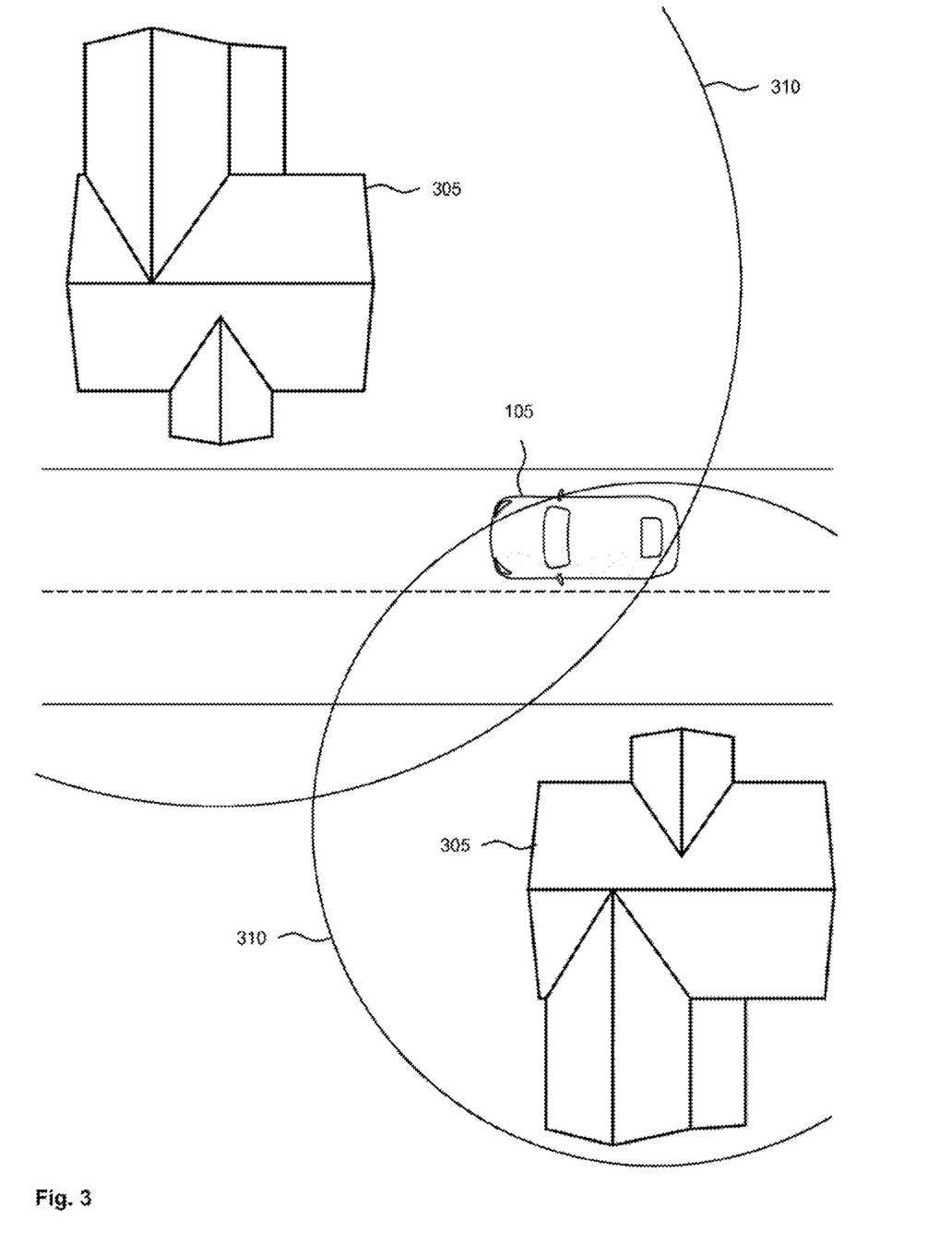
FIG. 3 illustrates an example situation of a motor vehicle.

FIG. 3 depicts an example situation of a motor vehicle 105 in the range of two WLAN stations 115 which are fixedly installed in houses 305. In another embodiment, a WLAN station 115 may also be installed, for example, in the area of a public place or another motor vehicle 105. Approximate ranges 310 are schematically depicted as circles around the WLAN stations 115. In the selected example, the motor vehicle 105 is within the range of two WLAN stations 115, such that Bluetooth® communication in the area of the motor vehicle 105 may be disturbed by electromagnetic signals on up to two WLAN channels. In particular, when the motor vehicle 105 is moving, it may be within the area of a WLAN station 115 for only a short period of time. On the other hand, this time may also be considerable if the motor vehicle 105 is stationary or moving at a constant distance from a moving WLAN station 115.

Figure 4:
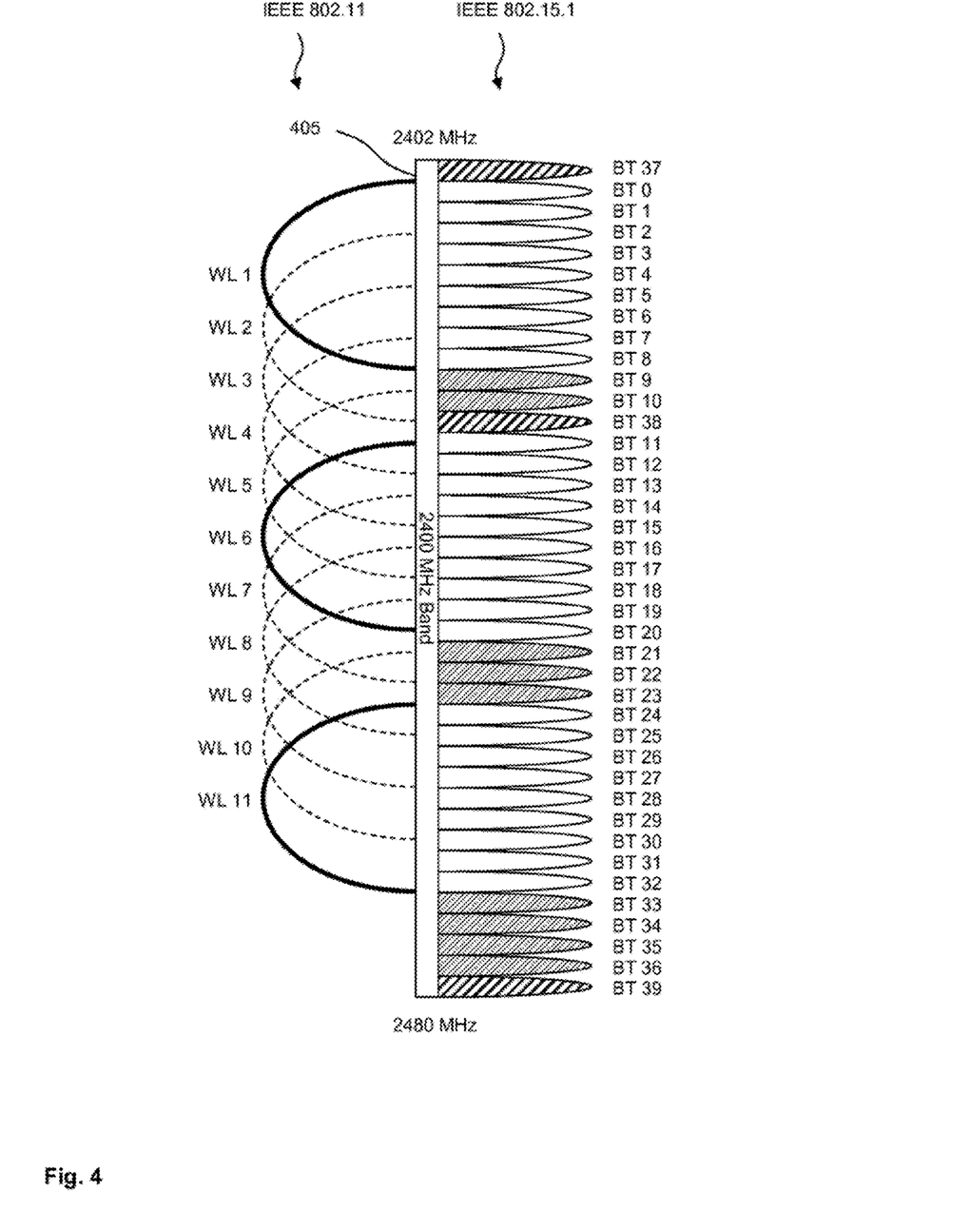
FIG. 4 illustrates a typical distribution of a frequency band for WLAN and Bluetooth® LE signals.

FIG. 4 depicts a typical distribution of a frequency range or frequency band 405 for WLAN and Bluetooth® LE signals. Vertically, the frequency band 405 is depicted in a frequency range between 2.402 GHz and 2.480 GHz. WLAN channels WL 1 to WL 11 are depicted on the left, and Bluetooth® channels BT 0 to BT 39 are depicted on the right. The bandwidth of a Bluetooth® channel BT is typically 1 MHz, while the bandwidth of a WLAN channel WL is considerably greater and typically covers approximately nine Bluetooth® channels.

To accommodate as many WLAN channels WL as possible in the frequency range 405 with minimal mutual interference, typical WLAN stations 115 attempt to use one of the WL channels 1, 6, and 11 (depicted by bold lines). If these three WLAN channels are occupied, the BT channels 9 to 10, 21 to 23, and 33 to 39 are relatively unaffected (shaded BT channels). Of these, channels 37 to 39 are "advertising channels" (broadly shaded BT channels) which can be used for the mutual location of communication partners and/or for negotiating communication parameters.

In order to reduce an influence of WLAN signals on the frequency range 405 and to enable local use by BT signals, it is proposed to transmit a reservation signal in the range of a WLAN channel, which preferably causes a WLAN station 115 to reduce its transmission power and/or its utilized bandwidth at least temporarily. It is assumed that the WLAN station 115 receives a signal on a channel WL before transmitting. If a signal can be received, the transmission power of the subsequently transmitted signal may be reduced as a function of the received signal, in particular its signal strength.

The reservation signal is preferably narrowband with respect to the WLAN channel WL and further preferably has at most the bandwidth of a Bluetooth® channel BT. A utilized transmission power may be as high as possible, wherein it is preferred that regulations with respect to the permissible transmission power are observed. These regulations may comprise the WLAN specification.

Figure 5:
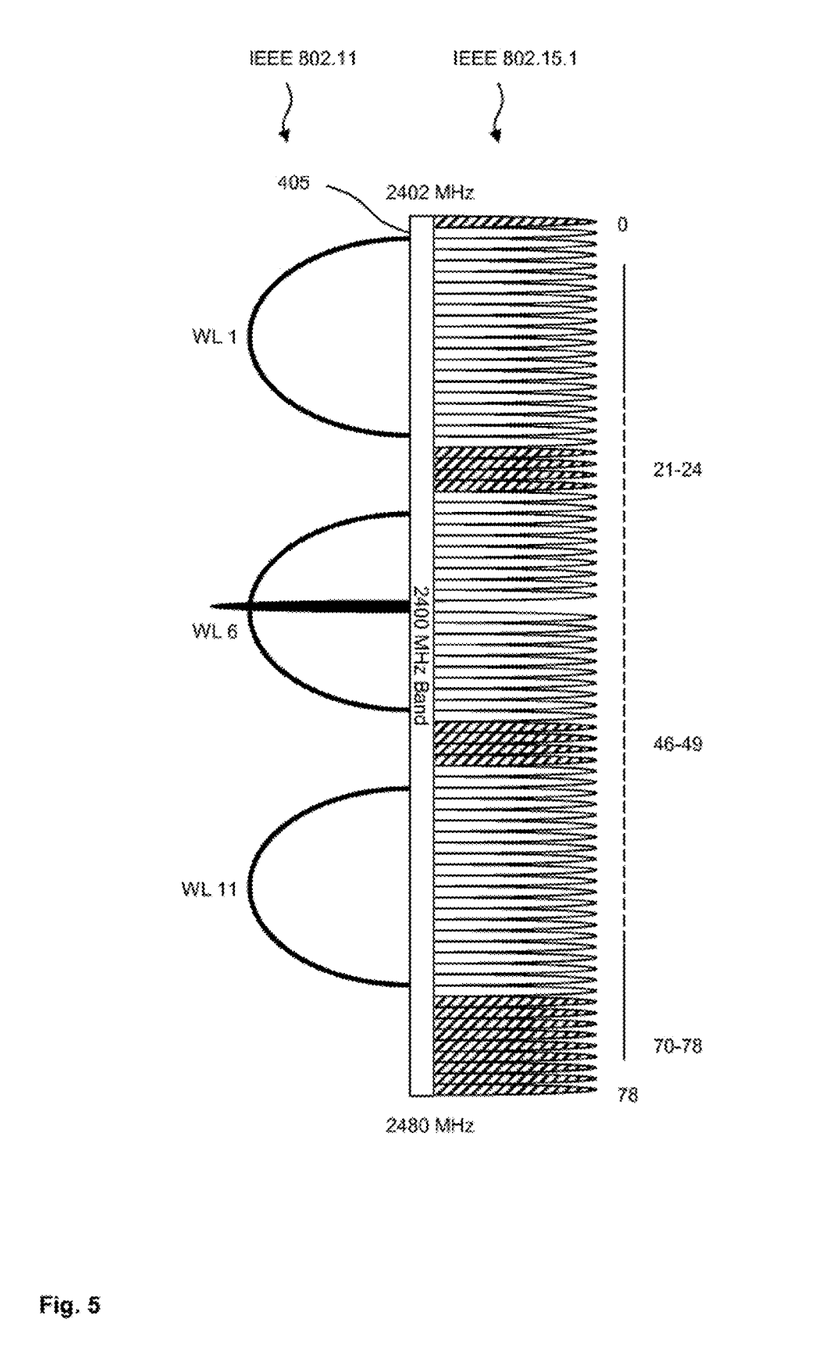
FIG. 5 illustrates a typical distribution of a frequency range for Bluetooth® signals.

FIG. 5 shows a depiction which is similar to that of FIG. 4, wherein, however, the original Bluetooth® signals are depicted instead of the Bluetooth® LE signals. Of the WLAN signals WL 1 to WL 11, only WL 1, WL 6, and WL 11 are plotted.

The depicted typical Bluetooth® signals also use the frequency range between 2402 and 2480 MHz. Here, 79 channels are defined, each having a bandwidth of 2 MHz and being designated by 0 to 79. Channels 0, 21 to 24, 46 to 49, and 70 to 78 are designated as "advertising channels."

It is proposed to transmit the second signal preferably in the center range of a WLAN channel. For example, in the depiction of FIG. 5, Bluetooth® channel 35 is used for this purpose. The strength of the second signal is preferably as high as possible, wherein locally applicable legal restrictions on WLAN signals should be observed.

The following table depicts preferred characteristics of the second signal:

| Packet | $T_{sco}$ [slots] | $T_s$ [µs] | $T_{on}$ [µs] | $T_{off}$ [µs] | DC |
|---|---|---|---|---|---|
| HV1 | 2 | 625 | 381 | 244 | 61% |
| HV2 | 4 | 2500 | 1006 | 1494 | 40% |
| HV3 | 6 | 3750 | 1006 | 2744 | 27% |

Here, $T_{on}$ is the time period during which the second wireless signal is broadcast, and $T_{off}$ is the time period during which no second wireless signal is broadcast. Other time periods may be used for different packet types (HV1 to HV3) which may correspond to different Bluetooth® profiles. The specified time periods are preferably to be regarded as approximate values.

REFERENCE CHARACTERS

100 System
105 Motor vehicle
110 External location
115 WLAN station
120 Apparatus
125 Processing device
130 Transmitting device
135 Electronic Device
140 Mobile device (communication partner)
142 Headset (communication partner, if applicable)
145 Receiving device (communication partner, if applicable)
150 Interface
200 Method
205 Bluetooth® communication?
210 Determine channel
215 Transmit signal
305 House
310 Range
405 Frequency band
BT Bluetooth® channel (0 to 39)
WL WLAN channel (1 to 11)

What is claimed is:

1. A method comprising:
  determining whether a wireless communication is occurring or will be occurring in an area of a motor vehicle, wherein
    the wireless communication is performed via a first wireless signal which is in a first frequency range and is approved for use according to the Bluetooth® standard; and
  in response to the determining, transmitting a second wireless signal in the area of the motor vehicle, wherein
    the second signal is in a second frequency range which is approved for use according to the WLAN standard and the Bluetooth® standard, and
    several Bluetooth® channels are defined in the second frequency range, and the second signal occupies only one of the Bluetooth® channels.

2. The method according to claim 1, wherein
the second signal is not included in the wireless communication.

3. The method according to claim 1, wherein
the second signal comprises a WLAN signal.

4. The method according to claim 1, wherein
the second signal is transmitted at predetermined time intervals.

5. The method according to claim 1, wherein
the wireless communication is determined based on the first signal.

6. The method according to claim 1, wherein
the wireless communication is determined based on a connection request from a communication partner of the wireless communication.

7. The method according to claim 1, wherein
the wireless communication relates to a voice connection.

8. An apparatus on board a motor vehicle comprising an electronic device, a transmitting device, and a processing device, and configured to:
perform the method of claim 1.

9. The apparatus according to claim 8, wherein
the wireless communication takes place between two communication partners of which one comprises a hands-free system on board the motor vehicle.

10. A motor vehicle comprising:
the apparatus according to claim 8.

11. A method comprising:
  determining whether a wireless communication is occurring or will be occurring in an area of a motor vehicle, wherein
    the wireless communication is performed via a first wireless signal which is in a first frequency range and is approved for use according to the Bluetooth® standard; and
  in response to the determining, transmitting a second wireless signal in the area of the motor vehicle, wherein
    the second signal is in a second frequency range which is approved for use according to the WLAN standard and the Bluetooth® standard, and
    the second signal is in the second frequency range of one of the WLAN channels 1, 6, or 11.

12. The method according to claim 11, wherein
the second signal is essentially in the center of a frequency range of the WLAN channel.

13. An apparatus on board a motor vehicle comprising an electronic device, a transmitting device, and a processing device, and configured to:
perform the method of claim 11.

14. The method according to claim 11, wherein
the second signal is not included in the wireless communication.

15. The method according to claim 11, wherein the second signal comprises a WLAN signal.

16. A method comprising:
   determining whether a wireless communication is occurring or will be occurring in an area of a motor vehicle, wherein
      the wireless communication is performed via a first wireless signal which is in a first frequency range and is approved for use according to the Bluetooth® standard; and
   in response to the determining, transmitting a second wireless signal in the area of the motor vehicle, wherein
      the second signal is in a second frequency range which is approved for use according to the WLAN standard and the Bluetooth® standard,
      the first and second frequency ranges both fall within a single WLAN channel according to the WLAN standard, and
      the second signal is transmitted while the wireless communication takes place.

17. An apparatus on board a motor vehicle comprising an electronic device, a transmitting device, and a processing device, and configured to:
   perform the method of claim 16.

18. The method according to claim 16, wherein the second signal is not included in the wireless communication.

19. The method according to claim 16, wherein the second signal comprises a WLAN signal.

* * * * *